United States Patent
Rosa et al.

(10) Patent No.: US 9,661,628 B2
(45) Date of Patent: May 23, 2017

(54) METHOD AND APPARATUS FOR RECEIVING TIMING INFORMATION FROM A CELL OR NETWORK IN A LESS ACTIVE MODE

(71) Applicant: Nokia Solutions and Networks Oy, Espoo (FI)

(72) Inventors: Claudio Rosa, Randers (DK); Frank Frederiksen, Klarup (DK); Timo Erkki Lunttila, Espoo (FI)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 14/440,672

(22) PCT Filed: Nov. 6, 2012

(86) PCT No.: PCT/EP2012/071890
§ 371 (c)(1),
(2) Date: May 5, 2015

(87) PCT Pub. No.: WO2014/071967
PCT Pub. Date: May 15, 2014

(65) Prior Publication Data
US 2015/0305024 A1    Oct. 22, 2015

(51) Int. Cl.
| H04W 4/00 | (2009.01) |
| H04W 72/04 | (2009.01) |
| H04W 56/00 | (2009.01) |
| H04L 5/00 | (2006.01) |
| H04W 48/16 | (2009.01) |

(52) U.S. Cl.
CPC ....... *H04W 72/0446* (2013.01); *H04L 5/0048* (2013.01); *H04W 48/16* (2013.01); *H04W 56/00* (2013.01); *H04W 72/042* (2013.01)

(58) Field of Classification Search
None
See application file for complete search history.

(56) References Cited

U.S. PATENT DOCUMENTS

| 5,361,397 A | 11/1994 | Wright .......................... 455/38.2 |
| 2011/0319030 A1 | 12/2011 | Kondo et al. ............... 455/67.11 |

(Continued)

FOREIGN PATENT DOCUMENTS

| GB | 2342018 A | 3/2000 |
| JP | 2011-250255 A | 8/2011 |
| KR | 10-0504352 B1 | 7/2005 |

(Continued)

OTHER PUBLICATIONS

RP-121415; Ericsson, ST-Ericsson; "New WI proposal: New Carrier Type for LTE"; 3GPP TSG-RAN Meeting #57; Chicago, USA, Sep. 4-7, 2012.

(Continued)

*Primary Examiner* — Minh-Trang Nguyen
(74) *Attorney, Agent, or Firm* — Harrington & Smith

(57) ABSTRACT

A method including receiving timing information associated with a transmission of reference information from a first cell or first network node when in a less active mode; and using the timing information to control when transmissions from the first cell or first network node are monitored for the reference information.

29 Claims, 4 Drawing Sheets

(56) References Cited

U.S. PATENT DOCUMENTS

2012/0015657 A1* 1/2012 Comsa .............. H04W 36/0094
455/436
2014/0086208 A1* 3/2014 Murray ............. H04W 36/0072
370/331

FOREIGN PATENT DOCUMENTS

| KR | 10-20120113779 A | 10/2012 |
|---|---|---|
| WO | WO-00/18151 A1 | 3/2000 |
| WO | WO-2010/093296 A1 | 8/2010 |
| WO | WO-2011/085238 A2 | 7/2011 |
| WO | WO 2013/117239 A1 | 8/2013 |
| WO | WO 2013/135295 A1 | 9/2013 |
| WO | WO-2013/158304 A1 | 10/2013 |
| WO | WO 2014/053151 A1 | 4/2014 |

OTHER PUBLICATIONS

Lu et al.; "An Adaptive Energy-Efficient and Low-Latency MAC for Data Gathering in wireless Sensor Networks"; IEEE Computer Society; Proceedings of the $18^{th}$ International Parallel and Distributed Processing Symposium (IPDPS'04); 2004; whole document (8 pages).
Salkintzis et al.; "An In-Band Power-Saving Protocol for Mobile Data Networks"; IEEE Transactions on Communications, vol. 46, No. 9; Sep. 1998; pp. 1194-1197 (abstract only).
3GPP TS 36.331 V10.7.0; "$3^{rd}$ Generation Partnership Project; Technical Specification Group Radio Access Network; Evolved Universal Terrestrial Radio Access (E-UTRA); Radio Resource Control (RRC); Protocol specification (Release 10)"; Sep. 2012; whole document (304 pages).

* cited by examiner

METHOD AND APPARATUS FOR RECEIVING TIMING INFORMATION FROM A CELL OR NETWORK IN A LESS ACTIVE MODE

This disclosure relates to methods and apparatus and in particular but not exclusively to methods and apparatus for use where a cell or network node has a lower activity mode.

A communication system can be seen as a facility that enables communication sessions between two or more nodes such as fixed or mobile devices, machine-type terminals, access nodes such as base stations, servers and so on. A communication system and compatible communicating entities typically operate in accordance with a given standard or specification which sets out what the various entities associated with the system are permitted to do and how that should be achieved. For example, the standards, specifications and related protocols can define the manner how devices shall communicate, how various aspects of communications shall be implemented and how devices for use in the system shall be configured.

A user can access the communication system by means of an appropriate communication device. A communication device of a user is often referred to as user equipment (UE) or terminal. A communication device is provided with an appropriate signal receiving and transmitting arrangement for enabling communications with other parties. Typically a device such as a user equipment is used for enabling receiving and transmission of communications such as speech and content data.

Communications can be carried on wireless carriers. Examples of wireless systems include public land mobile networks (PLMN) such as cellular networks, satellite based communication systems and different wireless local networks, for example wireless local area networks (WLAN). In wireless systems a communication device provides a transceiver station that can communicate with another communication device such as e.g. a base station of an access network and/or another user equipment. The two directions of communications between a base station and communication devices of users have been conventionally referred to as downlink and uplink. Downlink (DL) can be understood as the direction from the base station to the communication device and uplink (UL) the direction from the communication device to the base station.

Carrier aggregation (CA) has been proposed and this allows the bandwidth associated with a UE to be expanded by concurrently using radio resources across multiple carriers. The multiple component carriers are aggregated to form a larger overall transmission bandwidth.

According to an aspect, there is provided a method comprising: receiving timing information associated with a transmission of reference information from a first network node or first cell when in a less active mode; and using said timing information to control when transmissions from said first cell or first network node are monitored for said reference information.

The first network node may provide a cell. The first network node may be provided by a base station.

The monitoring may comprise measuring information and/or averaging of measurements. Monitoring may comprise processing the transmissions in order to obtain the reference information.

The timing information may comprise at least one of: information indicating a duration of said reference information transmission; information about a periodicity of said reference information transmission; start information indicating a start of said transmission of reference information; information indicating when said reference information is not available; and information indicating when said reference information is available.

The method may comprise receiving relative timing information indicating one or more of a relative timing of said first cell or first network node with respect to another cell or network node; a relative timing of said first cell or first network node with respect to a global timing reference; relative timing with respect to a timing of said first cell or first network node.

The method may comprise receiving mode information from which it is determinable if said first cell or first network node is in said less active mode.

This mode information may comprise information indicating when the first cell or first network node is in the less active mode and/or information indicating when the first cell or first network node is not in the less active mode. In some embodiments, the mode information may be received each time the first cell or first network node changes its mode. The mode information may indicate a start of said mode and/or duration of said mode.

The mode information may be broadcast by said first cell or first network node or from another cell or network node. The first cell may be a SCell and the another cell may be a PCell. The mode information may be received via dedicated signalling. The dedicated signalling may comprise radio resource control signalling or medium access control signalling.

The method may comprise receiving said information from another cell or network node.

The method may comprise receiving said information from said first cell or first network node.

The method may comprise receiving said information when at least one of: a user equipment enters a coverage area of another cell or network node; said first cell or first network node is on a list of target cells; and said user equipment is being provided with a measurement object associated with said first cell.

The reference information may comprise at least one of reference signal and/or a reference channel.

The reference signal and/or reference channel comprises one or more of: a channel state information reference signal; a common reference signal; a primary synchronisation signal; and a secondary synchronisation signal.

The less active mode may comprise a dormant mode.

The first cell in said less active mode may comprise a cell smaller than a macro cell.

Any of the methods above may be performed by an apparatus. The apparatus may be provided in a user equipment.

According to another aspect, there is provided a method comprising: causing timing information to be sent to a user equipment, said timing information associated with a transmission of reference information from a first network node or first cell when in a less active mode.

The first network node may provide a cell. The first network node may be provided by a base station.

The timing information may comprise at least one of: information indicating a duration of said reference information transmission; information about a periodicity of said reference information transmission; start information indicating a start of said transmission of reference information; information indicating when said reference information is not available; and information indicating when said reference information is available.

The method may comprise causing relative timing information to be transmitted, said relative timing information indicating one or more of a relative timing of said first cell or first network node with respect to another cell or network node; a relative timing of said first cell or first network node with respect to a global timing reference; relative timing with respect to a timing of said first cell or first network node.

The method may comprise causing mode information to be transmitted, said mode information being information from which is determinable if said first cell or first network node is in said less active mode.

This mode information may comprise information indicating when the first cell or first network node is in the less active mode and/or information indicating when the first cell or first network node is not in the less active mode. In some embodiments, the mode information may be provided each time the first cell or first network node changes its mode. The mode information may indicate a start of said mode and/or duration of said mode.

The method may comprise causing said information to be transmitted from another cell or network node.

The method may comprise causing said information to be transmitted from said first cell or first network node.

The method may comprising causing said information to be transmitted when at least one of: a user equipment enters a coverage area of another cell or network node; said first cell or first network node is on a list of target cells; and said user equipment is being provided with a measurement object associated with said first cell.

The reference information may comprise at least one of reference signal and/or a reference channel.

The reference signal and/or reference channel comprises one or more of: a channel state information reference signal; a common reference signal; a primary synchronisation signal; and a secondary synchronisation signal.

The less active mode may comprise a dormant mode.

The first cell in said less active mode may comprise a cell smaller than a macro cell.

The method may be performed by an apparatus. The apparatus may be provided in a network node.

According to another aspect, there is provided an apparatus comprising at least one processor and at least one memory including computer code for one or more programs, the at least one memory and the computer code configured, with the at least one processor, to cause the apparatus at least to: receive timing information associated with a transmission of reference information from a first network node or first cell when in a less active mode; and use said timing information to control when transmissions from said first cell or first network node are monitored for said reference information.

The first network node may provide a cell. The first network node may be provided by a base station.

The at least one memory and the computer code may be configured with the at least one processor to cause the apparatus to measure said reference information and/or average measurements. The at least one memory and the computer code may be configured with the at least one processor to cause the apparatus to process the transmissions in order to obtain the reference information.

The timing information may comprise at least one of: information indicating a duration of said reference information transmission; information about a periodicity of said reference information transmission; start information indicating a start of said transmission of reference information; information indicating when said reference information is not available; and information indicating when said reference information is available.

The at least one memory and the computer code may be configured with the at least one processor to cause the apparatus to receive relative timing information indicating one or more of a relative timing of said first cell or first network node with respect to another cell or network node; a relative timing of said first cell or first network node with respect to a global timing reference; relative timing with respect to a timing of said first cell.

The at least one memory and the computer code may be configured with the at least one processor to cause the apparatus to receive mode information from which it is determinable if said first cell or first network node is in said less active mode.

This mode information may comprise information indicating when the first cell or first network node is in the less active mode and/or information indicating when the first cell or first network node is not in the less active mode. In some embodiments, the mode information may be received each time the first cell or first network node changes its mode. The mode information may indicate a start of said mode and/or duration of said mode.

The mode information may be broadcast by said first cell or first network node or from another cell or network node. The first cell may be a SCell and the another cell may be a PCell. The mode information may be received via dedicated signalling. The dedicated signalling may comprise radio resource control signalling or medium access control signalling.

The at least one memory and the computer code may be configured with the at least one processor to cause the apparatus to receive said information from another cell or network node.

The at least one memory and the computer code may be configured with the at least one processor to cause the apparatus to receive said information from said first cell or network node.

The at least one memory and the computer code may be configured with the at least one processor to cause the apparatus to receive said information when at least one of: a user equipment enters a coverage area of another cell; said first cell or first network node is on a list of target cells; and said user equipment is being provided with a measurement object associated with said first cell.

The reference information may comprise at least one of reference signal and/or a reference channel.

The reference signal and/or reference channel comprises one or more of: a channel state information reference signal; a common reference signal; a primary synchronisation signal; and a secondary synchronisation signal.

The less active mode may comprise a dormant mode.

The cell in said less active mode may comprise a cell smaller than a macro cell.

According to another aspect, there is provided an apparatus comprising: means for receiving timing information associated with a transmission of reference information from a first network node or first cell when in a less active mode; and means for using said timing information to control when transmissions from said first cell or first network node are monitored for said reference information.

The first network node may provide a cell. The first network node may be provided by a base station.

The using means may measure information and/or average of measurements. The using means may process the transmissions in order to obtain the reference information.

The timing information may comprise at least one of: information indicating a duration of said reference information transmission; information about a periodicity of said reference information transmission; start information indicating a start of said transmission of reference information; information indicating when said reference information is not available; and information indicating when said reference information is available.

The apparatus may comprise receiving means for receiving relative timing information indicating one or more of a relative timing of said first cell or first network node with respect to another cell or network node; a relative timing of said first cell or first network node with respect to a global timing reference; relative timing with respect to a timing of said first cell or first network node.

The apparatus may comprise receiving means for receiving mode information from which it is determinable if said first cell or first network node is in said less active mode.

This mode information may comprise information indicating when the first cell or first network node is in the less active mode and/or information indicating when the first cell or first network node is not in the less active mode. In some embodiments, the mode information may be received each time the first cell or first network node changes its mode. The mode information may indicate a start of said mode and/or duration of said mode.

The mode information may be broadcast by said first cell or first network node or from another cell or network node. The first cell may be a SCell and the another cell may be a PCell. The mode information may be received by said receiving means via dedicated signalling. The dedicated signalling may comprise radio resource control signalling or medium access control signalling.

The receiving means may receive said information from another cell or network node.

The receiving means may receive said information from said first cell or first network node.

The receiving means may receive said information when at least one of: a user equipment enters a coverage area of another cell or network node; said first cell or first network node is on a list of target cells; and said user equipment is being provided with a measurement object associated with said first cell.

The reference information may comprise at least one of reference signal and/or a reference channel.

The reference signal and/or reference channel comprises one or more of: a channel state information reference signal; a common reference signal; primary synchronisation signal; and a secondary synchronisation signal.

The less active mode may comprise a dormant mode.

The cell in said less active mode may comprise a cell smaller than a macro cell.

The apparatus as discussed above may be provided in a user equipment.

According to another aspect, there is provided an apparatus comprising at least one processor and at least one memory including computer code for one or more programs, the at least one memory and the computer code configured, with the at least one processor, to cause the apparatus at least to: cause timing information to be sent to a user equipment, said timing information associated with a transmission of reference information from a first network node or first cell when in a less active mode.

The first network node may be a cell. The first network node may be provided by a base station.

The timing information may comprise at least one of: information indicating a duration of said reference information transmission; information about a periodicity of said reference information transmission; start information indicating a start of said transmission of reference information; information indicating when said reference information is not available; and information indicating when said reference information is available.

The at least one memory and the computer code may be configured with the at least one processor to cause the apparatus to cause relative timing information to be transmitted, said relative timing information indicating one or more of a relative timing of said first cell or first network node with respect to another cell or another network node; a relative timing of said first cell or first network node with respect to a global timing reference; relative timing with respect to a timing of said first cell.

The at least one memory and the computer code may be configured with the at least one processor to cause the apparatus to cause mode information to be transmitted, said mode information being information from which is determinable if said first cell or first network node is in said less active mode.

This mode information may comprise information indicating when the first cell or first network node is in the less active mode and/or information indicating when the first cell or first network node is not in the less active mode. In some embodiments, the mode information may be provided each time the first cell or first network node changes its mode. The mode information may indicate a start of said mode and/or duration of said mode.

The at least one memory and the computer code may be configured with the at least one processor to cause the apparatus to cause said information to be transmitted from another cell or network node.

The at least one memory and the computer code may be configured with the at least one processor to cause the apparatus to cause said information to be transmitted from said first cell or first network node.

The at least one memory and the computer code may be configured with the at least one processor to cause the apparatus to cause said information to be transmitted when at least one of: a user equipment enters a coverage area of another cell or network node; said first cell or first network node is on a list of target cells; and said user equipment is being provided with a measurement object associated with said first cell.

The reference information may comprise at least one of reference signal and/or a reference channel.

The reference signal and/or reference channel comprises one or more of: a channel state information reference signal; a common reference signal; a primary synchronisation signal; and a secondary synchronisation signal.

The less active mode may comprise a dormant mode.

The cell in said less active mode may comprise a cell smaller than a macro cell.

According to another aspect, there is provided an apparatus comprising: means for causing timing information to be sent to a user equipment, said timing information associated with a transmission of reference information from a first network node or first cell when in a less active mode.

The first network node may provide a cell. The first network node may be provided by a base station.

The timing information may comprise at least one of: information indicating a duration of said reference information transmission; information about a periodicity of said reference information transmission; start information indicating a start of said transmission of reference information; information indicating when said reference information is not available; and information indicating when said reference information is available.

The apparatus may comprise means for causing relative timing information to be transmitted, said relative timing information indicating one or more of a relative timing of said first cell or first network node with respect to another cell or network node; a relative timing of said first cell or first network node with respect to a global timing reference; relative timing with respect to a timing of said first cell.

The apparatus may comprise means for causing mode information to be transmitted, said mode information being information from which is determinable if said first cell or first network node is in said less active mode.

This mode information may comprise information indicating when the first cell or first network node is in the less active mode and/or information indicating when the first cell or first network node is not in the less active mode. In some embodiments, the mode information may be provided each time the first cell or first network node changes its mode. The mode information may indicate a start of said mode and/or duration of said mode.

The information may be transmitted from another cell or another network node and/or said first cell or first network node.

The causing means may cause said information to be transmitted when at least one of: a user equipment enters a coverage area of another cell or network node; said first cell or first network node is on a list of target cells; and said user equipment is being provided with a measurement object associated with said first cell.

The reference information may comprise at least one of reference signal and/or a reference channel.

The reference signal and/or reference channel comprises one or more of: a channel state information reference signal; a common reference signal; a primary synchronisation signal; and a secondary synchronisation signal.

The less active mode may comprise a dormant mode.

The cell in said less active mode may comprise a cell smaller than a macro cell.

The apparatus discussed above may be provided in a network node or cell. Different aspects may be provided with a first cell or first network node or network node and/or another cell or another network node or network node.

A computer program comprising program code means adapted to perform the method may also be provided. The computer program may be stored and/or otherwise embodied by means of a carrier medium.

It should be appreciated that any feature of any aspect may be combined with any other feature of any other aspect.

Embodiments will now be described in further detail, by way of example only, with reference to the following examples and accompanying drawings, in which.

In the following certain exemplifying embodiments are explained with reference to a wireless or mobile communication system serving mobile communication devices.

Before explaining in detail the exemplifying embodiments, certain general principles of a wireless communication system and mobile communication devices are briefly explained with reference to FIGS. 1 to 3 to assist in understanding the technology underlying the described examples.

In a wireless communication system mobile communication devices or user equipment (UE) 102, 103, 105 are provided wireless access via at least one base station or similar wireless transmitting and/or receiving node or point. In the FIG. 1 example two overlapping access systems or radio service areas of a cellular system 100 and 110 and three smaller radio service areas 115, 117 and 119 provided by base stations 106, 107, 116, 118 and 120 are shown. Each mobile communication device and station may have one or more radio channels open at the same time and may send signals to and/or receive signals from more than one source. It is noted that the radio service area borders or edges are schematically shown for illustration purposes only in FIG. 1. It shall also be understood that the sizes and shapes of radio service areas may vary considerably from the shapes of FIG. 1. A base station site can provide one or more cells. A base station can also provide a plurality of sectors, for example three radio sectors, each sector providing a cell or a subarea of a cell. All sectors within a cell can be served by the same base station.

Base stations are typically controlled by at least one appropriate controller apparatus so as to enable operation thereof and management of mobile communication devices in communication with the base stations. In FIG. 1 control apparatus 108 and 109 is shown to control the respective macro level base stations 106 and 107. The control apparatus of a base station can be interconnected with other control entities. The control apparatus is typically provided with memory capacity and at least one data processor. The control apparatus and functions may be distributed between a plurality of control units. In some systems, the control apparatus may additionally or alternatively be provided in a radio network controller.

Figure 1:
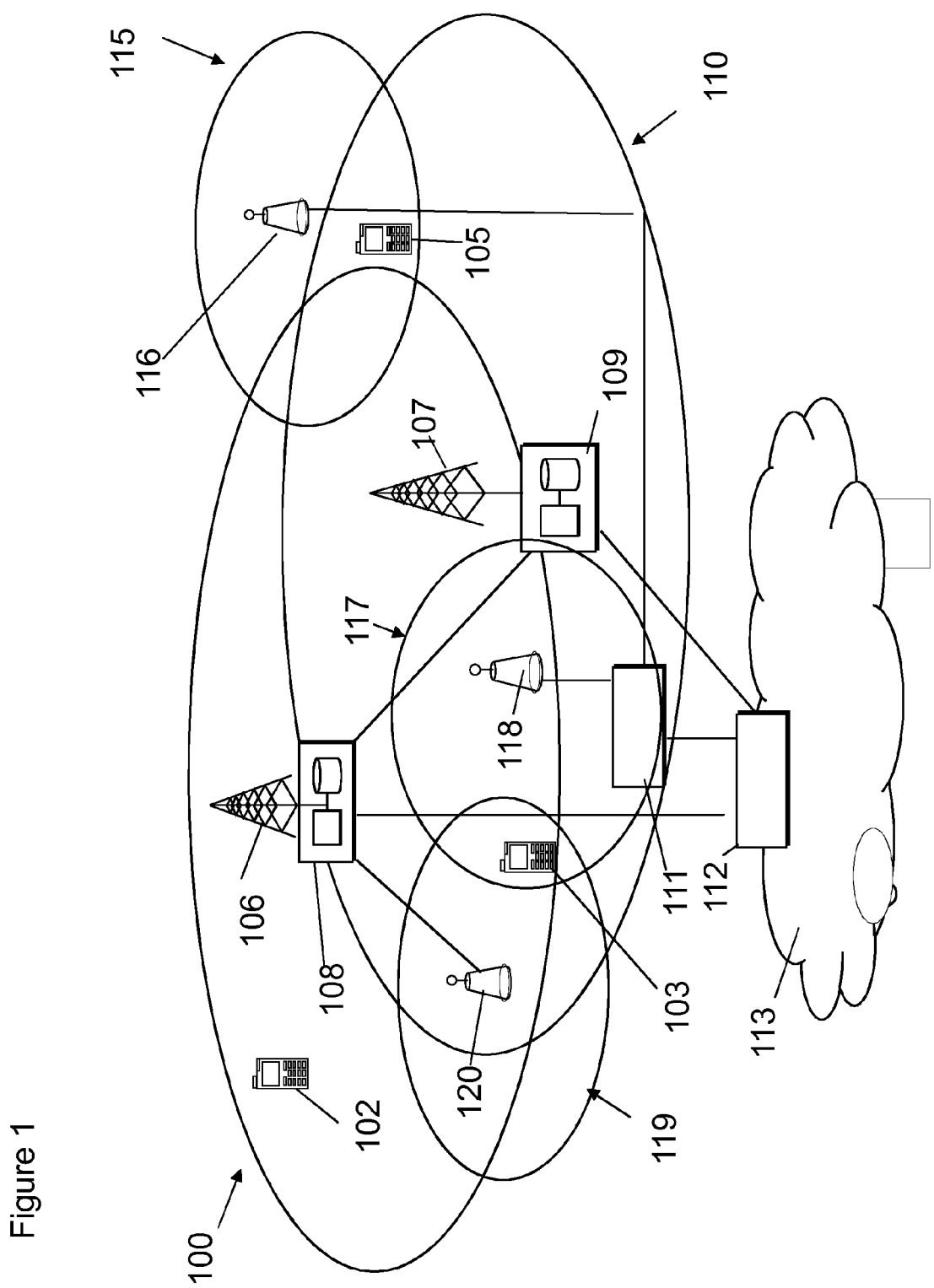
FIG. 1 shows a schematic diagram of a communication system comprising a base station and a plurality of communication devices.

In FIG. 1 stations 106 and 107 are shown as connected to a wider communications network 113 via gateway 112. A further gateway function may be provided to connect to another network.

The smaller stations 116, 118 and 120 can also be connected to the network 113, for example by a separate gateway function and/or via the controllers of the macro level stations. In the example, stations 116 and 118 are connected via a gateway 111 whilst station 120 connects via the controller apparatus 108. In some embodiments, the smaller stations may not be provided.

Figure 2:
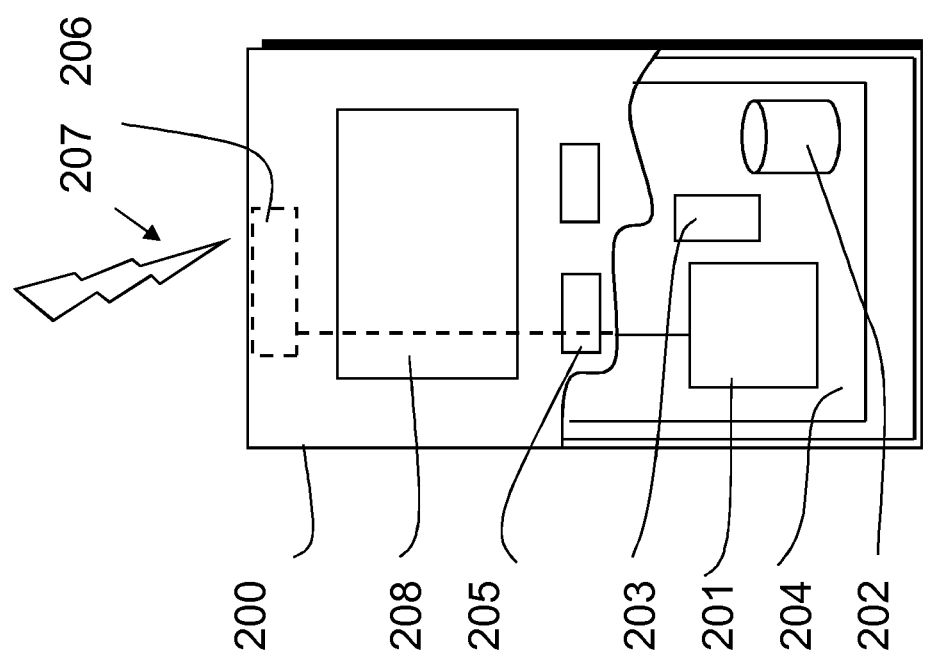
FIG. 2 shows a schematic diagram of a mobile communication device according to some embodiments.

A possible mobile communication device will now be described in more detail with reference to FIG. 2 showing a schematic, partially sectioned view of a communication device 102. Such a communication device is often referred to as user equipment (UE) or terminal. An appropriate mobile communication device may be provided by any device capable of sending and receiving radio signals. Non-limiting examples include a mobile station (MS) such as a mobile phone or what is known as a 'smart phone', a computer provided with a wireless interface card or other wireless interface facility, personal data assistant (PDA) provided with wireless communication capabilities, or any combinations of these or the like. A mobile communication device may provide, for example, communication of data for carrying communications such as voice, electronic mail (email), text message, multimedia and so on. Users may thus be offered and provided numerous services via their communication devices. Non-limiting examples of these services include two-way or multi-way calls, data communication or multimedia services or simply an access to a data communications network system, such as the Internet. Users may also be provided broadcast or multicast data. Non-limiting examples of the content include downloads, television and radio programs, videos, advertisements, various alerts and other information.

The mobile device 102 may receive signals over an air interface 207 via appropriate apparatus for receiving and may transmit signals via appropriate apparatus for transmitting radio signals. In FIG. 2 transceiver apparatus is designated schematically by block 206. The transceiver apparatus 206 may be provided for example by means of a radio part and associated antenna arrangement. The antenna arrangement may be arranged internally or externally to the mobile device.

A wireless communication device can be provided with a Multiple Input/Multiple Output (MIMO) antenna system. MIMO arrangements as such are known. MIMO systems use multiple antennas at the transmitter and receiver along with advanced digital signal processing to improve link quality and capacity. Although not shown in FIGS. 1 and 2, multiple antennas can be provided, for example at base stations and mobile stations, and the transceiver apparatus 206 of FIG. 2 can provide a plurality of antenna ports. More data can be received and/or sent where there are more antenna elements. A station may comprise an array of multiple antennas. Signalling and muting patterns can be associated with TX antenna numbers or port numbers of MIMO arrangements.

A mobile device is typically provided with at least one data processing entity 201, at least one memory 202 and other possible components 203 for use in software and hardware aided execution of tasks it is designed to perform, including control of access to and communications with access systems and other communication devices. The data processing, storage and other relevant control apparatus can be provided on an appropriate circuit board and/or in chipsets. This feature is denoted by reference 204. The user may control the operation of the mobile device by means of a suitable user interface such as key pad 205, voice commands, touch sensitive screen or pad, combinations thereof or the like. A display 208, a speaker and a microphone can be also provided. Furthermore, a mobile communication device may comprise appropriate connectors (either wired or wireless) to other devices and/or for connecting external accessories, for example hands-free equipment, thereto.

Figure 3:
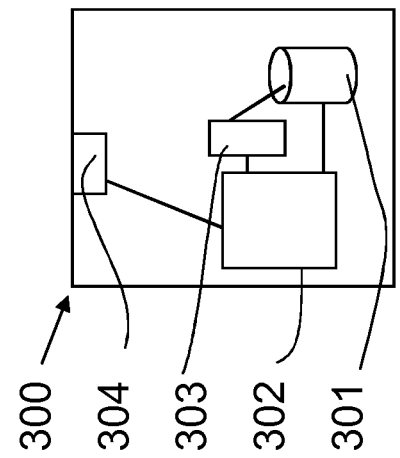
FIG. 3 shows a schematic diagram of a control apparatus according to some embodiments.

FIG. 3 shows an example of a control apparatus for a communication system, for example to be coupled to and/or for controlling a station of an access system, such as a base station. In some embodiments, base stations comprise a separate control apparatus. In other embodiments, the control apparatus can be another network element such as a radio network controller. In some embodiments, each base station may have such a control apparatus as well as a control apparatus being provided in a radio network controller. The control apparatus 109 can be arranged to provide control on communications in the service area of the system. The control apparatus 109 comprises at least one memory 301, at least one data processing unit 302, 303 and an input/output interface 304. Via the interface the control apparatus can be coupled to a receiver and a transmitter of the base station. The control apparatus 109 can be configured to execute an appropriate software code to provide the control functions.

The communication devices 102, 103, 105 can access the communication system based on various access techniques, such as code division multiple access (CDMA), or wideband CDMA (WCDMA). Other examples include time division multiple access (TDMA), frequency division multiple access (FDMA) and various schemes thereof such as the interleaved frequency division multiple access (IFDMA), single carrier frequency division multiple access (SC-FDMA) and orthogonal frequency division multiple access (OFDMA), space division multiple access (SDMA) and so on.

An example of wireless communication systems are architectures standardized by the 3rd Generation Partnership Project (3GPP). A latest 3GPP based development is often referred to as the long-term evolution (LTE) of the Universal Mobile Telecommunications System (UMTS) radio-access technology. The various development stages of the 3GPP LTE specifications are referred to as releases. More recent developments of the LTE are often referred to as LTE Advanced (LTE-A). The LTE employs a mobile architecture known as the Evolved Universal Terrestrial Radio Access Network (E-UTRAN). Base stations of such systems are known as evolved or enhanced Node Bs (eNBs) and may provide E-UTRAN features such as user plane Radio Link Control/Medium Access Control/Physical layer protocol (RLC/MAC/PHY) and control plane Radio Resource Control (RRC) protocol terminations towards the communication devices. Other examples of radio access system include those provided by base stations of systems that are based on technologies such as wireless local area network (WLAN) and/or WiMax (Worldwide Interoperability for Microwave Access).

As part 3GPP Release 12 a work item on NCT (new carrier type) has been proposed and agreed.

Various ways have been proposed to save as much energy as possible, for example at base stations, related controllers and mobile devices. One way to save energy is to minimise transmission and/or reception periods. For example, in the 3GPP the New Carrier Type (NCT) has also been proposed for maximizing eNodeB energy efficiency in the downlink (DL) by scheduling transmissions in as few DL subframes as possible. In this way the rest of the subframes may be kept empty ("blank") and the transmitter of the eNodeB can be shut down in those subframes to save energy.

Some embodiments relate to the use of the eNodeB (eNB) dormancy feature of NCT for example in the context of small cells. By way of example a small cell may be a pico cell, a HetNet cell or the like.

Solutions according to Release 8/9/10 of the 3GPP standard for legacy carriers allow for energy savings based on slow adaptation to traffic variations by ramping down the whole cell. However, even though a cell/carrier is not carrying any traffic, common signals and channels such as one or more of PDCCH (Physical Downlink Control Channel), PHICH (Physical Hybrid ARQ (Automatic Repeat-reQuest) Indicator Channel), PCFICH (Physical Control Format Indicator Channel), PSS/SSS (Primary Synchronization Signal/Secondary Synchronization Signal), PCH (Paging Channel), PBCH (Physical Broadcast Channel), SIB (system information block), CRS (Common Reference Signal) and CSI-RS (Channel State Information Reference Signal) should be transmitted with a certain periodicity in order to support mobility.

In some situations, one or more of the common signals and channels may be present in every subframe, making it difficult to turn off the eNodeB transmitter even in the absence of any DL data traffic. Therefore, one of the main drivers for NCT, first in Release 11 and later in Release 12, has been eNB energy savings.

One way to achieve eNB energy savings may be to introduce an eNB dormant state where the transmission of common signals and/or channels on a specific cell/carrier may be suspended for a larger number of subframes than the 4 subframes proposed and agreed during Release 11 work item phase. However, even if user equipment are aware that certain eNBs could be in a dormant state, those user equipment may still spend an unnecessary amount of time trying to synchronize to and/or perform RRM (radio resource management) measurements on cells that are in a dormant state. A disadvantage of this is that there may be unnecessary UE power consumption and/or potentially inaccurate measurements. This may be due to the UE not knowing when and if an eNB is transmitting common signals at a given time instance.

It has been proposed to introduce a DTX (Discontinuous Transmission) cycle for the transmission of common signals while the eNB is in dormant state. It has been proposed that the DTX ON period of an eNB should be aligned with the measurement gaps provided to the UEs in order to make sure that when the eNB is transmitting common signals the user equipment are synchronized on the corresponding carrier frequency. However, this may only be applicable to the case where measurement gaps are provided such as for non-CA capable terminals. Further, although the eNB can configure the measurement gaps so that the measurement gaps coincide with the eNB DTX ON period, the interval between two consecutive DTX ON periods may be much longer than the interval between two consecutive measurements gaps. Therefore, the situation can arise where the UE is attempting to synchronize to and/or perform measurement when the eNB is in dormant state.

Another proposal provides orthogonal discovery signals for small cells which are transmitted in a synchronized manner with existing macro cell DL signals. The discovery signals are orthogonalised in order to improve the probability of discovering small cells in very dense deployments. The proposal requires all cells in a specific area to transmit synchronization/discovery signals at the same time.

Some embodiments may be used with carrier aggregation. For example, some embodiments may be used in relation to inter-site CA. When configured with inter-site carrier aggregation, the user equipment is usually coupled to two or more non-co-located eNBs via separate frequency carriers. An umbrella cell eNB may control a primary cell PCell, whereas a small cell eNB may control one or more secondary cells SCells. A primary cell is a cell which may provide a user equipment with security control and non-access stratum (NAS) information, such as mobility support and support for session management procedures to establish and maintain Internet Protocol conductivity between the user equipment and a packet data network gateway. Other serving cells are called secondary serving cells. The PCell may be provided by a macro cell. However, in other embodiments, the PCell may be provided by any other suitable cell. The secondary cell may be provided by a small cell or any other suitable cell.

Alternatively or additionally, some embodiments may be used with autonomous UE mobility where the configuration of the reference signals transmissions is dependent on an activation state of the for example a carrier.

Some embodiments may be used in non-carrier aggregation situations. For example some embodiments may be used with small cell mobility with inter-frequency handover between cells.

Alternatively or additionally some embodiments may be used with other types of carrier aggregation. For example some embodiments may be used with het net cells using RRH (remote radio heads) where one or more carriers (including the PCell) are transmitted from the macro cell, and one or more carriers are transmitted from one or more small cells (realized using one or more RRHs (remote radio head)).

In some embodiments, when a small cell is configured as a SCell or alternatively as a potential target cell for UE autonomous mobility, the UE will be provided with information relating to the eNB dormant state.

The UE then applies this information in relation to the UE behavior in the network. The information that is provided to the UE may contain one or more of the following:

SFN (System Frame Number) offset (i.e. relative SFN) when the DTX ON period of eNB dormant state starts;
Duration of DTX ON period of the eNB dormant state;
Duration of DTX OFF period of the eNB dormant state;
Periodicity of DTX ON period of eNB dormant state;
One or more of the CRS (common reference signal)/PSS/SSS/CSI-RS (channel state information reference signal) configuration during DTX ON period of eNB dormant state (if different from the corresponding configuration during the eNB active state)
Relative timing information with respect to the PCell.

It should be appreciated that this information is by way of example and in other embodiments one or more different types of information may be used instead of or additionally to one or more of the above listed types of information.

Figure 4:
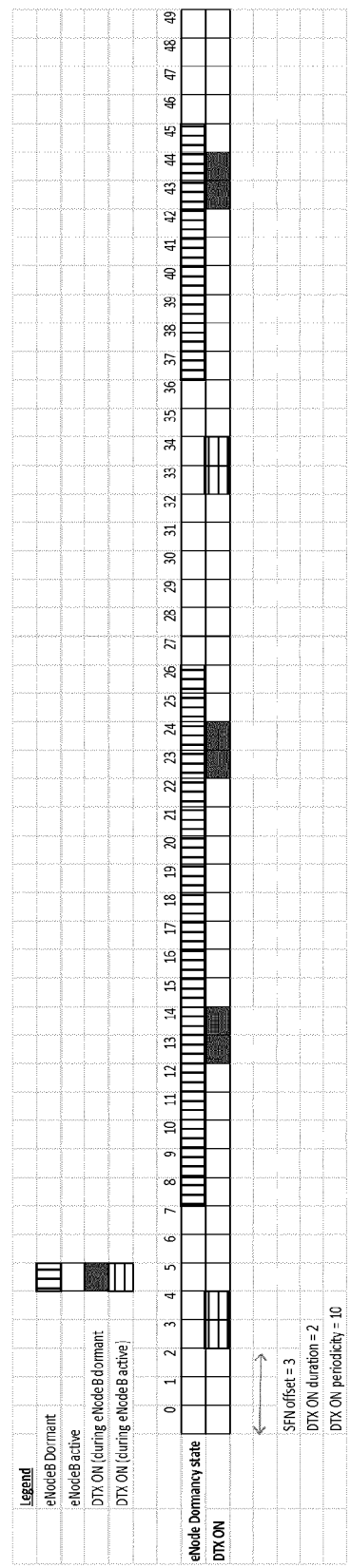
FIG. 4 shows an example of subframe timing for a base station having a dormancy state.

Reference is now made to FIG. 4 which shows an example of an embodiment. In this example, the SFN offset is set as 3 subframes, DTX ON duration=2 subframes, and the periodicity of DTX ON=10 subframes. These values are by way of example and of course may be different in different embodiments and/or situations. Furthermore, alternatively it is possible to define the DTX ON timing in terms of radio frames rather than subframes. When the DTX ON period falls within the eNodeB active period, there may not be any additional transmission of commons signals besides those that would anyway be transmitted during the eNodeB active state. In other words, in some embodiments, the "DTX ON" transmission is omitted when the eNodeB is in active state.

In the embodiment shown in FIG. 4, the eNB is in an active state for subframes 0 to 7. The eNB is then in a dormant state for subframes 8 to 26. The eNB is again in the active state from subframes 27 to 36 and in the dormant state from subframes 37 to 45. As the SFN offset is 3, the DTX ON duration will be in subframe 3. As of the DTX ON duration is 2, the DTX ON period is subframes 3 and 4. However, as the eNB is in the active state, there is no additional DTX ON transmission.

As the DTX ON periodicity is 10, the next DTX ON duration will be subframes 13 and 14. In this case, the eNB is in the dormant state and accordingly one or more of the reference signals/reference channels are transmitted in these subframes. Likewise, in the next DTX ON period, subframes 23 and 24, again the eNB is in the dormant state.

For the next DTX ON period, subframes 33 and 34, the eNB is active and accordingly, the behaviour is as set out in relation to subframes 3 and 4, and so on.

In some embodiments, the eNB may signal to the UE the start and end of a dormant state for a specific configured SCell/target cell. This signaling eNB may be the SCell or the PCell eNB. In some embodiments, the start/end of the dormant state of the SCell may be transmitted from the overlay macro cell, for example the PCell.

Whilst some embodiments have been described in relation to inter-site CA, other embodiments can, as mentioned previously be extended to other arrangements.

Figure 5:
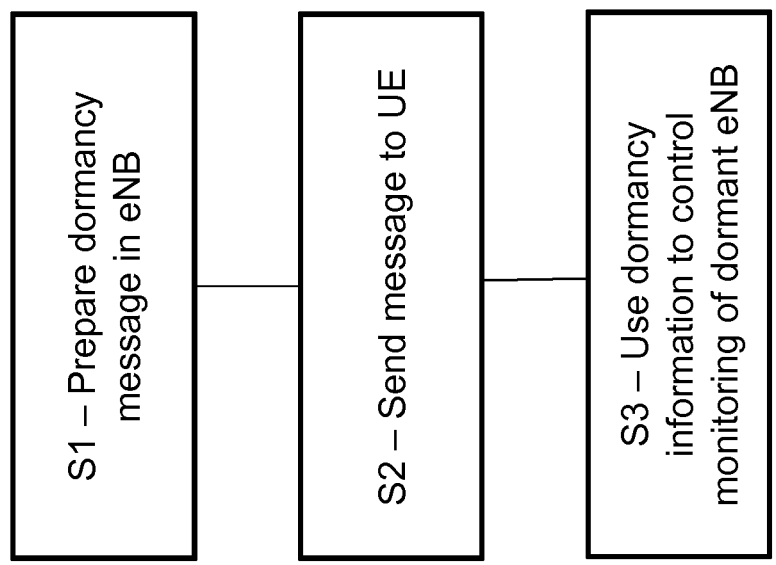
FIG. 5 shows a method of an embodiment.

Reference is now made to FIG. 5 which shows a method flow.

In step S1, a message with dormancy information is prepared in an eNB. In some embodiments, this message may be prepared in the PCell or a macro cell (which is different to the base station or cell which will have the dormancy periods). In some embodiments the message may be prepared in the cell which has the dormancy periods. The message may have any suitable dormancy information.

In one embodiment, the dormancy information may comprise the SFN offset (and subframe or radio frame offset) as well as the length and periodicity of DTX ON periods during eNB dormant state. The dormancy message may include information on the CRS/PSS/SSS/CSI-RS configuration used during DTX ON period of eNB dormant state (if different from configuration used during eNB active state).

In step S2, this message is sent to the UE. The message may for example be signaled as part of the SCell configuration message (RRC-radio resource control) which is transmitted to the UE when the UE enters the coverage area of a macro cell (PCell), and a number of small cells (SCells) are deployed on an independent carrier frequency in the corresponding coverage area.

Alternatively or additionally, this dormancy information may be provided to the UE when configuring a measurement object corresponding to a given small cell. An example of this is provided in 3GPP TS 36.331, section 5.5.1. The UE may be requested to perform inter frequency measurements, intra frequency measurements and inter RAT (Radio Access Technology) measurements. Examples of measurement objects may be a given frequency, a given frequency with a list of cell offsets and/or a set of black listed cells, a set of cells on a given frequency, a set of carrier frequencies, a set of cells on a carrier frequency.

Alternatively or additionally, the dormancy information may be provided to the UE when a given small cell is added to the list of target cells configured for autonomous UE mobility. Autonomous UE mobility may be where the UE is able to make mobility decisions by itself.

In step S3, the user equipment uses the dormancy information to control the monitoring of the dormant or potentially dormant eNB. In particular, the information included in the dormancy message allows the user equipment to effectively determine which one or more subframes should be monitored when the eNB is in the dormant state. The monitored subframes will include reference signals and/or reference channels transmitted by the dormant eNB.

In order to optimize cell search and RRM measurement procedures in the terminal, a UE may be informed about the current state of each configured SCell/target cell, i.e. whether the cell is in dormant or active state. This information can be one or more of:

broadcasted by the cell corresponding to the UE PCell (i.e. the overlay macro cell);

transmitted to the UE via dedicated signaling (RRC or MAC (medium access control)); and broadcasted by the cell corresponding to the UE SCell (i.e. the corresponding small cell)

A difference between broadcasting via the cell corresponding to the UE PCell and broadcasting via the cell corresponding to the UE SCell is an inter-site CA specific aspect. (If the PCell and SCell are collocated then there may be little difference as to whether the information is broadcast via the PCell or the SCell.) This may also apply to the case with autonomous UE mobility but may not necessarily be an issue with conventional CA (especially if PCell and SCell are co-located).

Broadcasting may happen via any of the one-to-many signaling mechanisms that are available. For example, any one or more of the following broadcasting mechanisms may be used: PBCH, MIB (Master Information block), SIB, or via PDCCH (common MAC (medium access control) message transmitted to all UEs that are able to synchronize to the corresponding cell). It should be appreciated that any other suitable broadcasting mechanism may alternatively or additionally be used.

One advantage of broadcasting is a reduced signaling overhead. The broadcast information from the corresponding small cell could take the form of advertising "future intent", such that all connected UEs and UEs in IDLE mode would have this information. In other words, information about a change in the state of the eNB is transmitted before the eNB enters that state.

Broadcasting via the overlay macro cell may bring additional overhead compared to broadcasting via the corresponding small cell due to necessity of signaling the eNB state change over X2 (the interface between the eNBs), and of including a cell-specific identifier in the broadcast message transmitted from the macro cell. However, broadcasting via the overlay macro cell has an advantage in that all the UEs in the macro cell coverage area are simultaneously informed of the state change of any small cell in the corresponding coverage area. Broadcasting via the corresponding small cell means that the UE will only be able to know the state of small cells that it is able to synchronize to. Some embodiments may thus use broadcasting by the macro cell and some embodiments may use broadcasting by the small cell. In some embodiments, both broadcasting by the macro cell and broadcasting by the small cell may be used.

Alternatively or additionally Dedicated signaling (RRC or MAC) is also a possibility to signal to the interested UEs the state change of a specific small cell. One advantage of dedicated signaling is the increased reliability, In another embodiment, the dormancy information (for example the SFN and subframe offsets, the length and periodicity of DTX ON periods during eNB dormant state, and/or the CRS/PSS/SSS/CSI-RS configuration used during DTX ON period of eNB dormant state) may be broadcast from the overlay macro cell.

Embodiments may be used with other releases of the LTE standard and/or with other standards.

In some embodiments, a user equipment may be configured to receive timing information associated with the transmission of reference information from a first cell when in a less active mode. This less active mode may be a dormant mode, as previously described. Alternatively, the less active mode may be one in which reference information is transmitted less frequently than when the first cell is fully or normally operational.

This first cell may be a smaller cell, as described previously. A small or smaller cell may be a Pico cell, a femto cell, a HetNet cell or a smaller cell deployed in conjunction with a macro cell.

This timing information may be used to control when transmissions from the first cell are monitored for the reference information.

In the previously described embodiments, specific examples of timing information have been provided. However, it should be appreciated that alternatively or additionally, the timing information may indicate at least one of duration of the reference information transmission, the periodicity of the reference information transmission and start information indicating start the transmission of the reference information.

It should be appreciated that in some embodiments, instead of or as well as being provided with information as to when the reference information will be transmitted, instead, the user equipment may be provided with information which indicates when the user equipment should not monitor for the reference information.

The user equipment may receive information indicating the relative timing of the smaller cell with respect to another cell. That other cell may for example be the PCell in some embodiments.

Where the start information is an offset, this will provide information to the user equipment as to the start point of the timing in the first cell. Of course, in some embodiments, the cells may be synchronised and as such the relative timing may not be required. However, for those systems where the cells are not synchronised, this may avoid the user equipment having to spend time determining the timing of the first cell. Of course, in some embodiments, the user equipment may monitor the first cell until such time as that the user equipment has the timing information for the first cell.

In some embodiment, the UE will receive relative timing information. This allow the UE to determine timing in the dormancy cell. This may provide information about the relative timing of the dormancy cell with respect to another, a relative timing of the dormancy cell with respect to a global timing reference and/or relative timing with respect to a timing of the dormancy cell.

An offset is an example of one type of start information. Other embodiments may use any other suitable start information.

Offset information or start information may be defined in terms of subframes and/or radio frames and/or time.

Information may be provided as to DTX mode being on and/or DTX mode being off.

DTX mode is one example of an inactive or lower activity mode. Alternative embodiments may be used with any other suitable inactive or lower activity mode.

Reference has been made to cells, in some embodiments. In some embodiments, the teachings may alternatively applied by a network node. The network node may be a base station or the like.

In some embodiments, the user equipment may receive mode information indicating when the first cell is in the less active mode. This information may be provided directly or indirectly. For example, the mode information may be provided when the state of the first cell changes to the less active mode. However, in some embodiments, the user equipment will assume that the first cell is in the less active mode unless the user equipment receives information indicating that the use the first cell is in the active mode. Of course, in some embodiments, the user equipment may receive information which indicates when the active mode starts and when the active mode ends.

Information may be provided as when the reference information is transmitted. Alternatively or additionally information may be provided as to when the reference information is not transmitted.

The information, such as the timing information, the relative timing information and/or the receiving mode information may be provided from the first cell and/or another cell.

The receiving of any one or more of the different types of information mentioned above may be caused when with inter-site CA, the first cell is configured as SCell (which might happen when a user equipment enters the coverage area of the corresponding umbrella macro cell eNB), when the first cell is just added to a list of target cells for UE autonomous mobility and/or when the user equipment is provided with the measurement objects associated with the first cell.

In the preceding examples, the reference information comprises CRS/PSS/SSS/CSI-RS. However, it should be appreciated that this is by way of example and different embodiments may use additional or alternative reference information. Reference information may comprise a reference signal(s) and/or a reference channel(s).

Reference has been made to particular configurations. Some embodiments may be applied to other configurations.

Reference has been made to various channels. It should be appreciated that other embodiments may be used with other channels.

It is noted that whilst embodiments have been described in relation to LTE, similar principles can be applied to any other communication system or to further developments with LTE. Thus, although the embodiments are described with references to uplink and downlink, this disclosure is not limited by these directions between a base station and a user terminal. Instead, some embodiments may be applicable to any system with transmissions between two or more communicating entities. For example, a communication system may be provided by means of a plurality of user equipment, for example in adhoc networks. Therefore, although certain embodiments were described above by way of example with reference to certain exemplifying architectures for wireless networks, technologies and standards, embodiments may be applied to any other suitable forms of communication systems than those illustrated and described herein.

The required data processing apparatus and functions of a base station apparatus, a communication device and any other appropriate apparatus may be provided by means of one or more data processors. The described functions at each end may be provided by separate processors or by an integrated processor. The data processors may be of any type suitable to the local technical environment, and may include one or more of general purpose computers, special purpose computers, microprocessors, digital signal processors (DSPs), application specific integrated circuits (ASIC), gate level circuits and processors based on multi core processor architecture, as non limiting examples. The data processing may be distributed across several data processing modules. A data processor may be provided by means of, for example, at least one chip. Appropriate memory capacity can also be provided in the relevant devices. The memory or memories may be of any type suitable to the local technical environment and may be implemented using any suitable data storage technology, such as semiconductor based memory devices, magnetic memory devices and systems, optical memory devices and systems, fixed memory and removable memory.

In general, the various embodiments may be implemented in hardware or special purpose circuits, software, logic or any combination thereof. Some aspects of the invention may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof. The software may be stored on such physical media as memory chips, or memory blocks implemented within the processor, magnetic media such as hard disk or floppy disks, and optical media such as for example DVD and the data variants thereof, CD.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention as defined in the appended claims. Indeed there is a further embodiment comprising a combination of one or more of any of the other embodiments previously discussed.

The invention claimed is:

1. A method comprising:
receiving, by a user equipment, timing information associated with a transmission of reference information from a network node of a first cell when the first cell is in a less active mode, wherein the timing information is received from a network node of a second cell, and wherein the first cell and the second cell cooperate in carrier aggregation; and
using said timing information to control when transmissions from said first cell are monitored for said reference information.

2. A method as claimed in claim 1, wherein said timing information comprises at least one of:
information indicating a duration of said reference information transmission;
information about a periodicity of said reference information transmission;
start information indicating a start of said transmission of reference information;
information indicating when said reference information is not available; and
information indicating when said reference information is available.

3. A method as claimed in claim 1, comprising receiving relative timing information indicating one or more of:
a relative timing of said first cell with respect to the second cell;
a relative timing of said first cell with respect to a global timing reference; and
relative timing with respect to a timing of said first cell.

4. A method as claimed in claim 1, comprising receiving mode information from which is determinable if said first cell node is in said less active mode.

5. A method as claimed in claim 1, wherein the second cell is a primary cell and the first cell is a secondary cell of the carrier aggregation, and the network nodes providing the cells are non-co-located.

6. A method as claimed in claim 1, comprising receiving said information when the user equipment enters a coverage area of the second cell.

7. A method as claimed in claim 1, comprising receiving said information when at least one of:
said first cell is on a list of target cells; and
said user equipment is being provided with a measurement object associated with said first cell.

8. A method as claimed in claim 1, wherein said reference information comprises at least one of reference signal and/or a reference channel.

9. A method as claimed in claim 1, wherein said less active mode comprises a dormant mode.

10. A method as claimed in claim 1, wherein said first cell in said less active mode comprises a cell smaller than the second cell, wherein the second cell is a macro cell.

11. A computer program product comprising a non-transitory computer-readable storage medium bearing computer program code embodied therein for use with a computer, the computer program code comprising code for performing the method according to claim 1.

12. A method comprising:
causing timing information to be sent from a network node of a second cell to a user equipment, said timing information associated with a transmission of reference information from a network node of a first cell when the first cell is in a less active mode, wherein the first cell and the second cell cooperate in carrier aggregation.

13. A method as claimed in claim 12, wherein said timing information comprises at least one of:
information indicating a duration of said reference information transmission;
information about a periodicity of said reference information transmission;
start information indicating a start of said transmission of reference information;
information indicating when said reference information is not available; and
information indicating when said reference information is available.

14. A method as claimed in claim 12, comprising causing relative timing information to be transmitted, said relative timing information indicating one or more of:
a relative timing of said first cell with respect to the second cell;
a relative timing of said first cell with respecting to a global timing reference; and
relative timing with respect to a timing of said first cell.

15. A method as claimed in claim 12, comprising causing mode information to be transmitted, said mode information being information from which is determinable if said first cell is in said less active mode.

16. A method as claimed in claim 12, comprising causing said information to be transmitted when at least one of:
the user equipment enters a coverage area of the second cell;
said first cell is on a list of target cells; and
said user equipment is being provided with a measurement object associated with said first cell.

17. A method as claimed in claim 12, wherein said reference information comprises at least one of reference signal and/or a reference channel.

18. A computer program product comprising a non-transitory computer-readable storage medium bearing computer program code embodied therein for use with a computer, the computer program code comprising code for performing the method according to claim 12.

19. An apparatus comprising:
at least one processor; and
at least one memory including computer code for one or more programs, the at least one memory and the computer code configured, with the at least one processor, to cause the apparatus at least to:
receive timing information associated with a transmission of reference information from a network node of a first cell when the first cell is in a less active mode, wherein the timing information is received from a network node of a second cell, and wherein the first cell and the second cell cooperate in carrier aggregation; and
use said timing information to control when transmissions from said first cell are monitored for said reference information.

20. Apparatus as claimed in claim 19, wherein the timing information may comprise at least one of:
information indicating a duration of said reference information transmission;
information about a periodicity of said reference information transmission;
start information indicating a start of said transmission of reference information;
information indicating when said reference information is not available; and
information indicating when said reference information is available.

21. Apparatus as claimed in claim 19, wherein the at least one memory and the computer code are configured with the at least one processor to cause the apparatus to receive relative timing information indicating one or more of:
a relative timing of said first cell with respect to the second cell;
a relative timing of said first cell with respect to a global timing reference; and
relative timing with respect to a timing of said first cell.

22. Apparatus as claimed in claim 19, wherein the at least one memory and the computer code are configured with the at least one processor to cause the apparatus to receive mode information from which it is determinable if said first cell is in said less active mode.

23. Apparatus as claimed in claim 19, wherein the second cell is a primary cell and the first cell is a secondary cell of the carrier aggregation, and the network nodes providing the cells are non-co-located.

24. Apparatus as claimed in claim 19, comprising receiving said information when the user equipment enters a coverage area of the second cell.

25. Apparatus as claimed in claim 19, wherein the at least one memory and the computer code are configured with the at least one processor to cause the apparatus to receive said information when at least one of:
said first cell is on a list of target cells; and
said user equipment is being provided with a measurement object associated with said first cell.

26. Apparatus as claimed in claim 19, wherein the reference information comprises at least one of a reference signal and/or a reference channel.

27. Apparatus as claimed in claim 19, wherein the less active mode comprises a dormant mode.

28. Apparatus as claimed in claim 19, wherein the first cell in said less active mode comprises a cell smaller than the second cell, wherein the second cell is a macro cell.

29. An apparatus comprising:
at least one processor; and
at least one memory including computer code for one or more programs, the at least one memory and the computer code configured, with the at least one processor, to cause the apparatus at least to:
cause timing information to be sent from a network node of a second cell to a user equipment, said timing information associated with a transmission of reference information from a network node of a first cell when the first cell is in a less active mode, wherein the first cell and the second cell cooperate in carrier aggregation.

* * * * *